United States Patent
Soltis, Jr. et al.

(10) Patent No.: US 7,930,539 B2
(45) Date of Patent: *Apr. 19, 2011

(54) COMPUTER SYSTEM RESOURCE ACCESS CONTROL

(75) Inventors: Donald C. Soltis, Jr., Fort Collins, CO (US); Rohit Bhatia, Fort Collins, CO (US); Eric R. DeLano, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1646 days.

This patent is subject to a terminal disclaimer.

(21) Appl. No.: 10/910,652

(22) Filed: Aug. 3, 2004

(65) Prior Publication Data

US 2006/0031679 A1    Feb. 9, 2006

(51) Int. Cl.
*H04L 29/00* (2006.01)
*G06F 12/14* (2006.01)
*G06F 17/30* (2006.01)

(52) U.S. Cl. ............ 713/167; 713/165; 713/166; 726/2; 726/22; 726/30

(58) Field of Classification Search .......... 713/150–152, 713/164–167; 726/26–29, 34
See application file for complete search history.

(56) References Cited

U.S. PATENT DOCUMENTS

| | | |
|---|---|---|
| 4,192,451 A | 3/1980 | Swerling et al. |
| 4,300,192 A | 11/1981 | Couleur et al. |
| 4,601,033 A | 7/1986 | Whelan |
| 4,843,541 A | 6/1989 | Bean et al. |
| 4,982,403 A | 1/1991 | DuChene et al. |
| 5,117,350 A | 5/1992 | Parrish et al. |
| 5,210,844 A | 5/1993 | Shimura et al. |
| 5,253,255 A | 10/1993 | Carbine |
| 5,258,985 A | 11/1993 | Spence et al. |
| 5,319,760 A | 6/1994 | Mason et al. |
| 5,522,075 A | 5/1996 | Robinson et al. |
| 5,530,706 A | 6/1996 | Josephson et al. |
| 5,564,040 A | 10/1996 | Kubala |
| 5,631,913 A | 5/1997 | Maeda |
| 5,644,609 A | 7/1997 | Bockhaus et al. |
| 5,710,938 A | 1/1998 | Dahl et al. |

(Continued)

FOREIGN PATENT DOCUMENTS

EP    0965917 A1    12/1999

(Continued)

OTHER PUBLICATIONS

Intel, Intel Itanium Processor Family System Abstraction Layer Specification Update, Jan. 2003, http://www.intel.com/design/itanium/downloads/25248902.pdf.

(Continued)

*Primary Examiner* — Nasser Moazzami
*Assistant Examiner* — Fatoumata Traore (57) ABSTRACT

In a computer system including a plurality of resources, a device receives a request from a software program to access a specified one of the plurality of resources, determines whether the specified one of the plurality of resources is a protected resource. If the specified one of the plurality of resources is a protected resource, the device denies the request if the computer system is operating in a protected mode of operation, and processes the request based on access rights associated with the software program if the computer system is not operating in the protected mode of operation.

23 Claims, 8 Drawing Sheets

U.S. PATENT DOCUMENTS

| | | | |
|---|---|---|---|
| 5,761,477 A | 6/1998 | Wahbe et al. | |
| 5,867,644 A | 2/1999 | Ranson et al. | |
| 5,938,784 A | 8/1999 | Kim | |
| 5,987,536 A * | 11/1999 | Johnson et al. | 710/36 |
| 6,151,618 A | 11/2000 | Wahbe et al. | |
| 6,199,181 B1 | 3/2001 | Rechef et al. | |
| 6,253,224 B1 | 6/2001 | Brice, Jr. et al. | |
| 6,272,612 B1 | 8/2001 | Bordaz et al. | |
| 6,282,643 B1 * | 8/2001 | Cromer et al. | 713/2 |
| 7,366,911 B2 * | 4/2008 | Garay et al. | 713/180 |
| 2003/0084256 A1 | 5/2003 | McKee | |
| 2003/0110205 A1 | 6/2003 | Johnson | |
| 2003/0233524 A1 * | 12/2003 | Poisner | 711/156 |
| 2004/0139346 A1 * | 7/2004 | Watt et al. | 713/200 |
| 2005/0138234 A1 | 6/2005 | Khan et al. | |

FOREIGN PATENT DOCUMENTS

| | | |
|---|---|---|
| JP | 07073695 A | 3/1995 |

OTHER PUBLICATIONS

Intel, Itanium Processor Family System Abstraction Layer, Specification, Nov. 2002, http://www.intel.com/design/itanium/downloads/24535907.pdf.

Intel, Intel Itanium Architecture Software Developer's Manual, vol. 2: System Architecture, Revision 2.1, Oct. 2002, Chapter 11 Only, http://www.intel.com/design/itanium/manuals/iiasdmanual.htm.

Office Action, dated Nov. 16, 2007, U.S. Appl. No. 10/910,630, 19 pages.

* cited by examiner

COMPUTER SYSTEM RESOURCE ACCESS CONTROL

CROSS REFERENCE TO RELATED APPLICATIONS

This application is related to a concurrently-filed and commonly-owned U.S. patent application Ser. No. 10/910,630, filed on Aug. 3, 2004, entitled "Resource Protection in a Computer System with Direct Hardware Resource Access," which is hereby incorporated by reference.

BACKGROUND

1. Field of the Invention

The present invention relates to computer architecture and, more particularly, to techniques for controlling access to resources in a computer system.

2. Related Art

Computers include a variety of resources, including memory (e.g., ROM and RAM), processor registers, and input/output devices. In early computer architectures, any program executing on a computer could access any resource without limitation. For example, any program, whether it be an operating system, device driver, or application program, could read and write values to any memory location. Although such computer architectures had the advantage of being relatively simple to design and implement, they had the disadvantage that a poorly-designed or malicious program could cause the computer to malfunction by modifying a resource in an inappropriate way. For example, an application program could inadvertently or maliciously modify data relied upon by the operating system and thereby cause the operating system to malfunction or crash. As another example, a first application program could overwrite data in use by a second application program, thereby causing the second application program to malfunction or crash.

One technique that has been employed to address this problem is to provide each software program executing on a computer with a particular set of resource access rights (also referred to as "privileges"). A particular application program may, for example, have the right to access a particular subset of main memory and a particular set of I/O devices. Another application program may have the right to access a different subset of main memory and a different set of I/O devices. The operating system typically has the right to access all resources.

A resource access control mechanism, which may be implemented in hardware and/or software, is provided for enforcing these access rights. When a particular program requests that a particular operation be performed on a particular resource, the access control mechanism determines whether the program has the right to perform the requested operation on the specified resource. If the program does have such a right, the access control mechanism allows the requested operation to proceed. Otherwise, the access control mechanism denies the request and typically generates a fault.

In a particular computer system, there may be a large number of resources and a large variety of access rights that can be associated with each resource (such as the right to read from the resource, write to the resource, and execute software on the resource). Instead of allowing each program to be assigned an individually-configurable set of access rights, most systems define a set of "privilege levels," each of which is associated with a particular set of access rights. Each program is then assigned one of the predefined privilege levels, thereby granting to the program the set of access rights associated with the assigned privilege level.

Consider a simple example of a computer system which has two privilege levels: (1) a most-privileged level (sometimes referred to as the "kernel privilege level"); and (2) a less-privileged level (sometimes referred to as the "application program privilege level"). Programs executing at the kernel privilege level may have the right to perform all operations on all resources, while programs executing at the application program privilege level typically have the right to execute only instructions within a certain subset of the processor's instruction set and to access only a subset of the computer's memory. In such a system, the operating system typically is assigned the kernel privilege level, while application programs typically are assigned the application program privilege level. The use of privilege levels makes it possible to assign and identify the access rights granted to a particular program by reference to the program's privilege level, without the need to assign and identify individual access rights on a program-by-program basis. The use of privilege levels is described in more detail in the commonly-owned patent application entitled "Method and System for Privilege-Level-Access to Memory Within a Computer," Pub. No. U.S. 2003/0084256 A1, published on May 1, 2003, hereby incorporated by reference.

There may be any number of privilege levels in a computer system. Typically, privilege levels are numbered sequentially beginning with zero. Consider, for example, a system in which there are four privilege levels, numbered from zero through three. Privilege level zero typically is the most-privileged level. The operating system typically has privilege level zero. Intermediate privilege levels (such as privilege levels 1 and 2) may be granted to device drivers and other software programs which require a relatively high degree of access to a subset of the computer's resources. The least-privileged level (e.g., privilege level 3) typically is assigned to application programs.

Computer systems which implement resource access control rights, such as through the use of privilege levels, thereby prevent programs from accessing resources in ways which might cause the system to malfunction. As computer architectures continue to evolve, however, the techniques described above may be insufficient to provide the necessary kind and degree of resource access control for all resources in a computer system. What is needed, therefore, are improved techniques for controlling access to resources in a computer system.

SUMMARY

In a computer system including a plurality of resources, techniques are disclosed for receiving a request from a software program to access a specified one of the plurality of resources, determining whether the specified one of the plurality of resources is a protected resource, and, if the specified one of the plurality of resources is a protected resource, for denying the request if the computer system is operating in a protected mode of operation, and processing the request based on access rights associated with the software program if the computer system is not operating in the protected mode of operation.

Other features and advantages of various aspects and embodiments of the present invention will become apparent from the following description and from the claims.

DETAILED DESCRIPTION

Techniques are disclosed for controlling access to protected resources in a computer system. The computer system may include a plurality of resources, which includes both the protected resources and non-protected resources. The computer system may recognize a plurality of privilege levels, such as a most-privileged level and a less-privileged level. Furthermore, the computer system may operate in a protected mode, in which all software programs (including software programs having the most-privileged privilege level) are denied access to the protected resources, or a non-protected mode, in which software programs with an appropriate privilege level may access the protected resources. In one embodiment, particular programs may be denied access to the protected resources by mapping the protected resources to addresses outside of the address spaces allocated to the particular programs.

Figure 1:
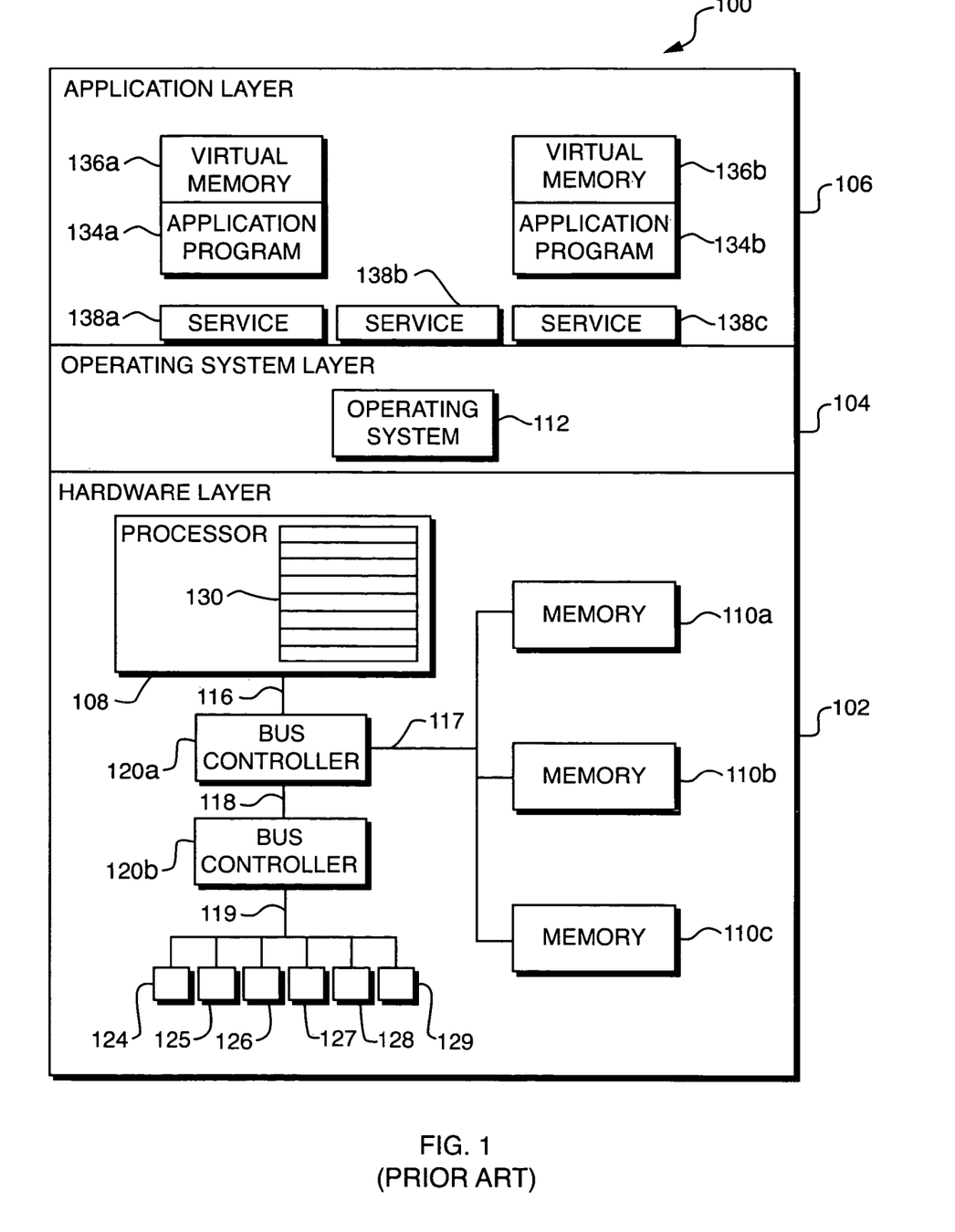
FIG. 1 is a block diagram of a prior art computer system including a hardware layer, an operating system layer, and an application layer.

Referring to FIG. 1, a block diagram is shown of a prior art computer system 100. The computer system 100 includes a hardware layer 102, an operating system layer 104, and an application program layer 106. The operating system and application programs in the computer system 100 execute on hardware in the hardware layer 102. The "layers" 104 and 106 illustrated in FIG. 1 do not, therefore, represent physical layers of components which are physically layered on top of the hardware layer 102. Rather, the computer system 100 is illustrated as consisting of layers 102, 104, and 106 as an aid to explaining the interactions among hardware and software in the computer system 100. In particular, it is common to conceptualize and illustrate computer systems in terms of such layers to highlight the dependence of elements at a higher layer on elements at lower layers, and to illustrate the flow of control and data among layers.

The hardware layer 102 comprises the physical components of the computer system 100. Such physical components may include, for example, a processor 108, memory storage components 110a-c, internal buses and signal lines 116-119, bus controllers 120a-b, and various peripheral interface cards 124-129. The processor 108 is an instruction-execution device that executes a stream of instructions obtained from memory components 110a-c. The processor 108 contains internal memory storage components referred to as registers 130 that can be accessed much more quickly than the memory components 110a-c. The processor 108 reads and writes data and instructions from and to the memory components 110a-c via internal buses 116 and 117 and the bus controller 120a. Far greater data storage capacity resides in peripheral data storage devices such as disk drives, CD-ROM drives, DVD drives, and other such components that are accessed by the processor 108 via internal buses 116, 118, and 119, bus controllers 120a-b, and one or more of the peripheral device interconnect cards 124-129. For example, the stored instructions of a large program may reside on a disk drive for retrieval and storage in memory components 110a-c on an as-needed basis during execution of the program. More sophisticated computers may include multiple processors with correspondingly more complex internal bus interconnections and additional components.

The operating system layer 104 is a logical layer which includes a software program 112 referred to as an operating system, which is capable of controlling the hardware components in the hardware layer 102. Modern operating systems are relatively large and complex, typically consisting of a large number of sub-programs executing concurrently. At its core, however, the operating system 112 includes program code which may be utilized by application programs to cause the hardware components in the hardware layer 102 to perform functions such as reading from and writing to memory and peripheral devices.

The application programming layer 106 includes one or more application programs. Two application programs 134a-b illustrated in FIG. 1 for ease of illustration and explanation. The operating system 112 allocates virtual memory regions 136a-b to application programs 134a-b, respectively. Note that the virtual memory regions 136a-b are not additional regions of physical memory, but rather are logical regions which are mapped to memory locations in the memory components 110a-c. Requests by the application programs 134a-b to access the corresponding virtual memory regions 136a-b are passed through the operating system 112, which performs the requested read/write operation on the appropriate location(s) in the memory components 110a-c. In addition, the operating system 112 denies any request by the application programs 134a-b to access memory addresses outside of their respective virtual memory regions 136a-b, thereby providing a degree of resource access control.

One way in which the application programs 134a-b may be restricted to accessing memory in the corresponding virtual memory regions 136a-b is by using the privilege-based access control techniques described above. For example, a most-privileged privilege level may be assigned to the operating system 112, while a less-privileged privilege level may be assigned to both of the application programs 134a-b. The operating system 112, due to its most-privileged status, may access any memory location in the memory components 110a-c. The application programs 134a-b, in contrast, due to their less-privileged status, may be denied the ability to execute processor instructions which directly access the memory storage components 110a-c. The application programs 134a-b may, therefore, only access memory components 110a-c indirectly through the operating system 112, which may refuse to process requests by the application programs 134a-b to access memory locations outside of their respective virtual memory regions 136a-b. Typically, an operating system indicates in hardware the access rights of the virtual memory sections, thereby allowing the hardware to grant or refuse access to privileged resources.

The application layer 106 may include a variety of services 138a-c, provided by the operating system 112, through which the application programs 134a-b may communicate with the operating system 112. Such services 138a-c may, for example, enable the application programs 134a-b to perform operations such as writing data to and retrieving data from external devices, or accessing system information (such as an internal clock or system configuration information).

Although in the description above multiple programs are described as executing concurrently, in a single-processor computer system such as the system 100 illustrated in FIG. 1, only one process executes on the processor 108 at a time. Concurrent program execution may be simulated by causing the processor 108 to alternate between executing instructions from the first program 134a and the second program 134b. The operating system 104 typically manages such "multi-threading" by retrieving a subset of instructions from the first program 134a, executing those instructions on the processor 108, retrieving a subset of instructions from the second program 134b, executing those instructions on the processor 108, and so on. Various techniques are well-known to those having ordinary skill in the art for implementing operating systems which manage such multithreading in efficient ways.

It is important in such systems that the privilege level associated with each program be enforced while instructions from that program are executing on the processor 108. In some systems such enforcement is performed by including a processor status register in the register file 130. The processor status register includes one or more bits which specify the privilege level of the currently-executing program. Such bits are referred to herein as "current privilege level" (CPL) bits. In a system which recognizes two privilege levels, for example, a single CPL bit may be used, in which a value of zero represents a most-privileged level and a value of one represents a less-privileged level.

In such systems, the hardware layer 102 controls access to the CPL bits. For less-privileged code to perform a more-privileged operation, the less-privileged code (such as code in the application programs 134a-b) must trigger a fault or trap through the hardware layer 102 to the operating system layer 104. In response, the hardware layer 102 sets the value of the CPL bits to indicate the more-privileged privilege level, and transfers control to more-privileged code to perform some operation on behalf of the less-privileged code. It should be appreciated from this description that software programs, such as the operating system 112, which have the most-privileged privilege level, may perform operations requiring any privilege level (including the most-privileged level) on behalf of less-privileged code. The more-privileged code may then execute a return-from-interruption instruction, which restores the less-privileged value of the CPL bits before returning control to the less-privileged code.

Consider, for example, the execution of instructions in one of the application programs 134a-b by the operating system 112. Before executing instructions from one of the application programs 134a-b, the operating system 112 may set the value of the CPL bit to one (using a hardware trap/fault), representing the less-privileged (application program) privilege level. The operating system 112 may then initiate execution of the application program instructions, which will execute with the resource-access restrictions associated with the application program privilege level. Prior to executing system management operations (such as operations which manipulate the contents of control registers and operating-specific data structures), the operating system 112 may use a hardware fault or trap to set the value of the CPL bit to zero, representing the most-privileged (kernel) privilege level. The operating system 112 may then perform the desired system management functions, after which the hardware layer 102 may restore the current privilege level to the privilege level of the application program. In this way the operating system 112 may perform operations with full access to all system resources, while the applications programs 134a-b are provided with limited access to system resources.

Figure 2A:
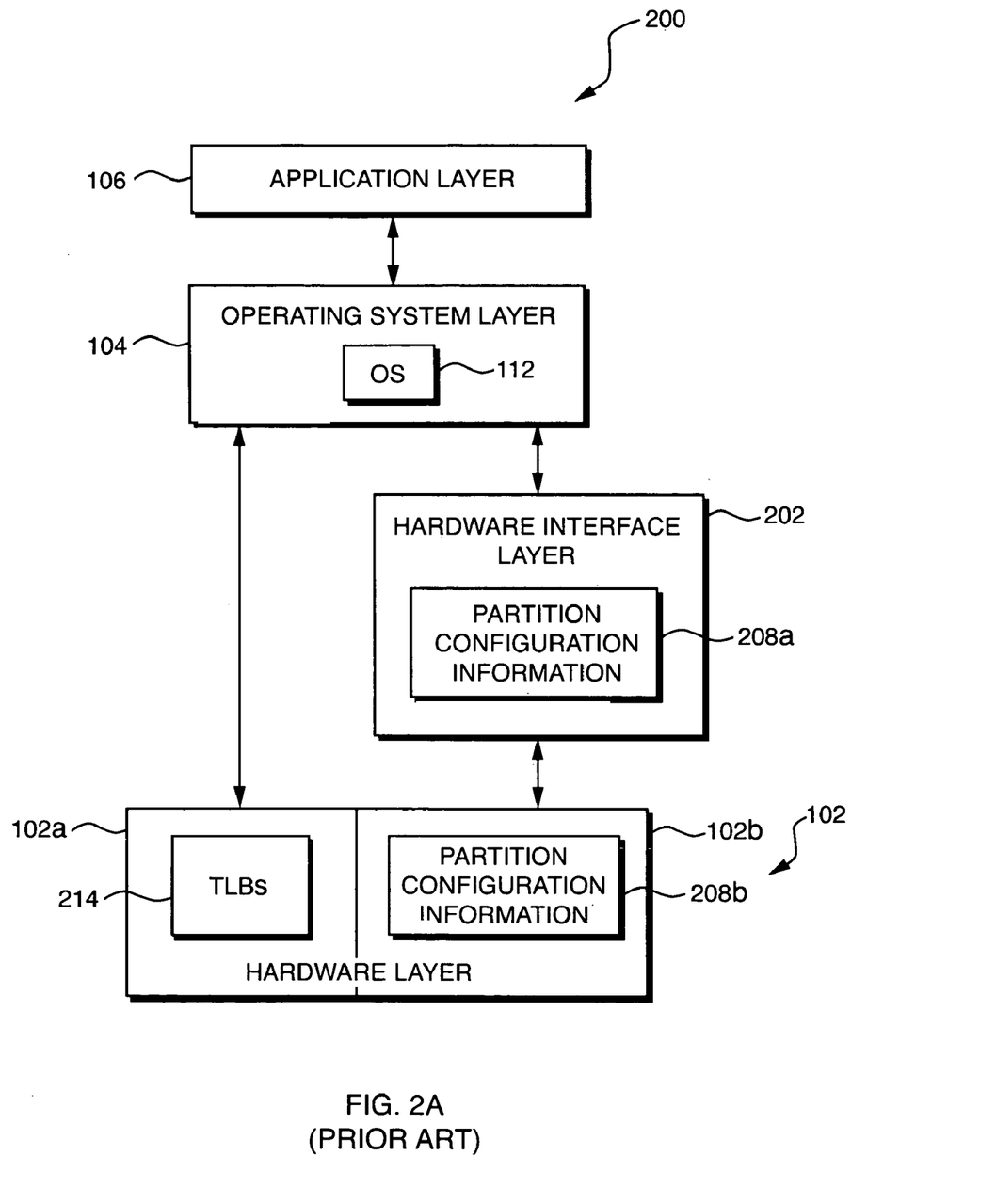
FIG. 2A is a block diagram of a prior art computer system including a hardware layer, a hardware interface layer, an operating system layer, and an application layer.

Although the computer system illustrated in FIG. 1 includes three layers 102, 104, and 106, some modern computer architectures include additional layers. Referring to FIG. 2A, for example, a computer system 200 is shown which includes hardware layer 102, operating system layer, application layer 106, and a hardware interface layer 202 interposed between the hardware layer 102 and the operating system layer 104. The hardware interface layer 202, as its name suggests, acts as an interface between the operating system layer 104 and the hardware layer 102. The hardware interface layer 202 may include hardware, software, firmware, or any combination thereof.

One purpose of the hardware interface layer 202 may be to provide a single abstract interface through which the operating system layer 104 may communicate with the processor 108 and other components in the hardware layer 102, regardless of the particular manner in which such components are implemented. The hardware interface layer 202 thereby enables the processor 108 and other hardware components to be implemented in a variety of ways without modifying the operating system layer 104 or the application layer 106. As a result, designers of the components in the hardware layer 102 have greater flexibility and designers of the operating system 112 and application programs 134a-b need not take implementation details of the hardware layer 102 into account when designing the operating system 112 and application programs 134a-b. As a result, the time and cost required to develop the operating system 112, the application programs 134a-b, and the hardware components in the hardware layer 102 may be reduced.

The Intel® Itanium® Architecture, for example, defines a Processor Abstraction Layer (PAL) and a System Abstraction Layer (SAL). In one embodiment of the present invention, the hardware interface layer 202 includes a PAL and a SAL. The PAL is defined in Volume 2, Chapter 11 of the "Intel® Itanium® Architecture Software Developer's Manual," Revision 2.1 (October 2002), hereby incorporated by reference. The SAL is defined in the "Itanium® Processor Family System Abstraction Layer Specification" (November 2002) and the corresponding "Intel® Itanium® Processor Family System Abstraction Layer Specification Update" (January 2003), both of which are hereby incorporated by reference.

In general, the PAL provides an abstract interface (implemented in firmware) between software programs (such as the operating system 112 and application programs 134a-b) and the processor 108, so as to maintain a single software interface for multiple implementations of the processor 108. The PAL encapsulates those processor functions that are likely to be implemented in different ways in different processor implementations, so that the operating system 112 can maintain a consistent view of the processor 108. These functions include non-performance critical functions such as processor initialization, configuration, and error handling. The PAL consists of two main components. The first is a set of interruption entry points, which are invoked directly by hardware events such as reset, init, and machine checks. These interruption entry points perform functions such as processor initialization and error recovery. The second PAL component is a set of procedures, which may be called by higher-level firmware (such as the SAL, described below) and software:

(1) to obtain information about the identification, configuration, and capabilities of the processor 108; (2) to perform implementation-dependent functions such as cache initialization; and (3) to allow software (e.g., the operating system 112 and application programs 134*a-b*) to interact with the hardware layer 102 through such functions as power management and enabling/disabling of processor features.

The SAL performs functions similar to those performed by the PAL, except that the SAL provides a firmware interface to the platform of the computer system 220. The term "platform" refers to components in the hardware layer 102 including the processor 108, buses 116-119, and memory 110*a-c*. The SAL does not interact directly with the processor 108, but rather, like the operating system 112, interacts with the processor 108 through the PAL.

Another function that may be performed by the hardware interface layer 202 is the establishment and maintenance of multiple "partitions" in a partitionable computer system. The term "partitionable computer system" refers to a computer system which may be logically subdivided into multiple "partitions," each of which is allocated a portion of the computer's resources. For example, each partition may be allocated a particular processor and portion of main memory. Furthermore, each partition may execute its own operating system and software applications, and otherwise act similarly to an independent physical computer. A single partitionable computer system may, therefore, provide the same functionality as a plurality of distinct physical computers.

The hardware interface layer 202 may allocate resources to partitions and ensure that software programs are only able to access resources within their own partitions. Ideally, conventional operating systems and application programs which are designed to execute in non-partitioned computer systems may also execute without modification in a partition of a partitionable computer system. The hardware interface layer 202 may intercept all resource access requests issued by the operating system in a particular partition, identify the resource (e.g., memory location) addressed by the request, satisfy the request using the allocated resource, and return the results to the operating system.

To perform such partition management, and resource management more generally, the system 200 may include partition configuration information 208*a-b*. Such information 208*a-b* may include, for example, a table which specifies the resources (e.g., processors, memory, I/O ports) which are allocated to each partition. The hardware interface layer 202 may access such information 208*a-b* when processing resource access requests issued by the operating system layer 104.

Note that in the particular system 200 illustrated in FIG. 2A, a first portion 208*a* of the partition configuration information is contained in the hardware interface layer 202, while a second portion 208*b* of the partition configuration information is contained in the hardware layer 102. Note further that in the system 200 illustrated in FIG. 2A, the operating system layer 104 may only access the partition configuration information 208*a-b* through the hardware interface layer 202. The hardware interface layer 202 may, for example, verify that the operating system layer 104 has a sufficiently high privilege level to access the partition configuration information 208*a-b*.

The hardware layer 102 is illustrated in FIG. 2A as comprising two portions 102*a-b*. As just described, the operating system layer 104 may only access resources in portion 102*b* (such as the partition configuration information 208*b*) through the hardware interface layer 202. The operating system layer 104 may, however, access resources in the other portion 102*a* of the hardware layer 102 directly, i.e., without going through the hardware interface layer 202. Translation lookaside buffer (TLBs) 214 are one example of resources in the hardware layer 102 which may be accessed by the operating system 104 without going through the hardware interface layer 202.

The partition configuration information 208*a-b* and other information maintained by the hardware layer 102 and the hardware interface layer 202 may be stored, for example, in registers, on-board memory, or in portions of the main memory 110*a-c*. It may be desirable for such information 204*a-b* to be accessible to the hardware layer 102 and to the hardware interface layer 202, but not to the operating system 112 or to the application programs 134*a-b*. Recall, however, that the operating system 112 typically has the most-privileged privilege level, according to which the operating system 112 has access to all system resources. If some or all of the partition configuration information 208*a-b*, however, is stored in memory components 110*a-c* or another resource accessible to the operating system 112, the operating system 112 would be able to modify such information 208*a-b* if the techniques disclosed above were employed. Examples of techniques will now be described for protecting resources, such as the partition configuration information 208*a-b*, against being accessed even by software programs having the most-privileged privilege level.

Figure 2B:
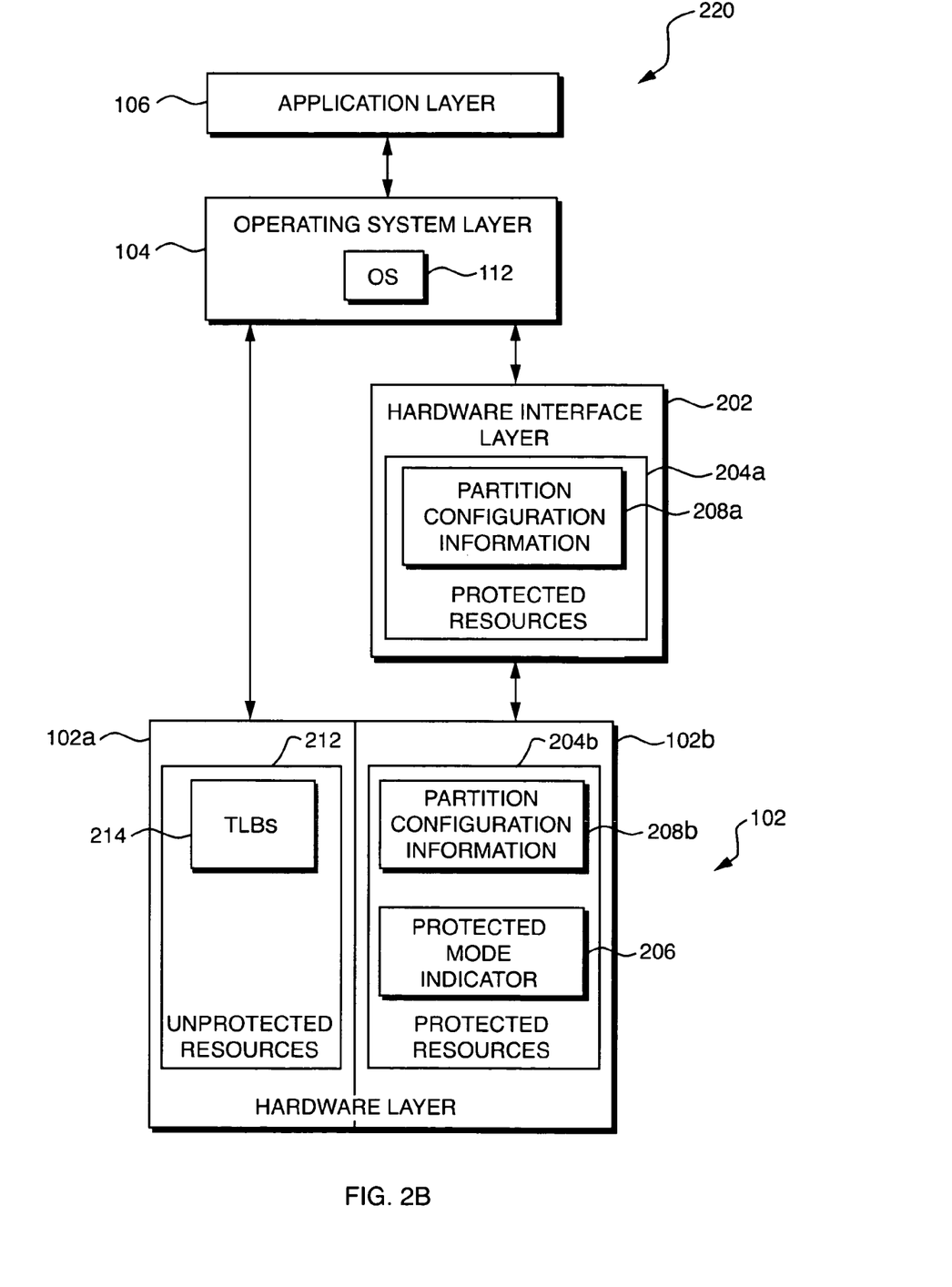
FIG. 2B is a block diagram of a computer system including protected resources according to one embodiment of the present invention.

Referring to FIG. 2B, a diagram is shown of a computer system 220 according to one embodiment of the present invention. The computer system 220, like the computer system 200 shown in FIG. 2A, includes hardware layer 102, hardware interface layer 202, operating system layer 104, and application layer 106. The system 220 also includes protected resources 204*a-b*. In particular, the hardware interface layer 202 of computer system 220 includes protected resources 204*a*, while the hardware layer 102 of computer system 220 includes protected resources 204*b*. In the embodiment illustrated in FIG. 2B, the protected resources 204*a* and 204*b* include partition configuration information 208*a* and 208*b*, respectively. In addition, the protected resources 204*b* include a protected mode indicator 206. As will be described in more detail below, the computer system 220 may operate in a protected mode in which software in the operating system layer 104 and application layer 106 is prevented from accessing the protected resources 204*a-b*, even if the software has the most-privileged privilege level.

The protected mode indicator 206 indicates whether the computer system 220 is to operate in protected mode. The protected mode indicator 206 may, for example, be implemented in one or more bits in a register (such as the processor status register (PSR)) in the hardware interface layer 202. Assume for purposes of the following discussion that the protected mode indicator 206 is a one-bit value PM, that when PM=0 the computer system 220 operates in non-protected mode, and that when PM=1 the computer system 220 operates in protected mode. When the computer system 220 operates in non-protected mode, software (e.g., the operating system 112) having the most-privileged privilege level is given unrestricted access to all resources, including the protected resources 204*a-b*.

When the computer system 220 operates in protected mode, access to protected resources 204*a-b* by all software at all privilege levels is denied. In one embodiment of the present invention, the value of the protected mode indicator 206 may only be modified by a hardware fault initiated by the hardware interface layer 202 (e.g., the PAL). Neither the operating system 112 nor any other software program may modify the value of the protected mode indicator 206, regardless of the privilege level of the software program. This guarantees that only the hardware interface layer 202 (e.g., the PAL) can obtain and grant access to the protected resources 204*a-b*. The value of the protected mode indicator 206 may be restored to its previous value (e.g., 1) upon a return from such a hardware fault.

Figure 3:
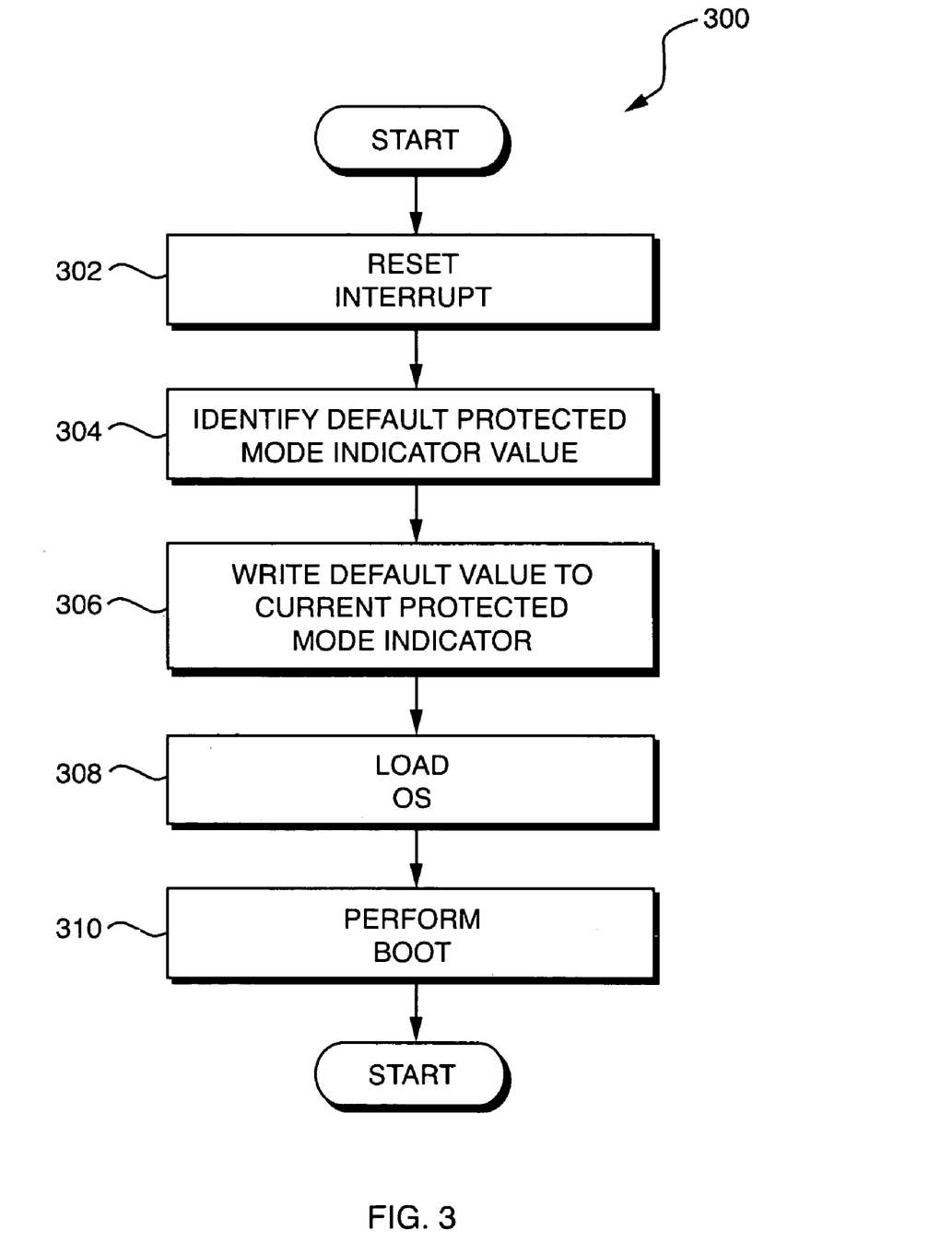
FIG. 3 is a flowchart of a method that is performed in one embodiment of the present invention to set the value of a protected mode indicator according to one embodiment of the present invention.
Figure 4:
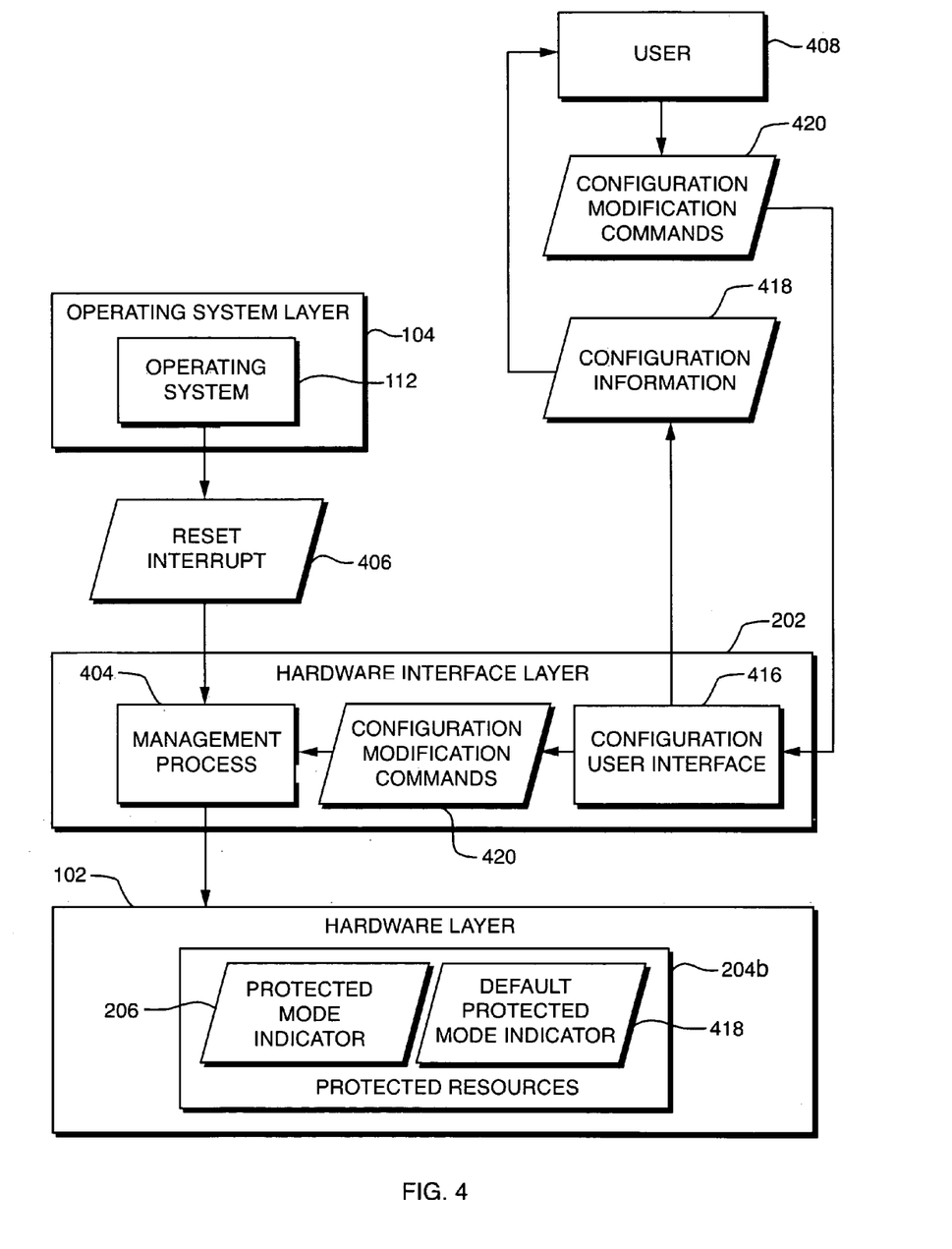
FIG. 4 is a dataflow diagram illustrating the actions performed by the hardware interface layer of FIG. 2B to perform the method of FIG. 3 according to one embodiment of the present invention.

Referring to FIG. 3, a flowchart is shown of a method 300 that is performed by the hardware interface layer 202 and the hardware layer 102 to set the value of the protected mode indicator 206 according to one embodiment of the present invention. Referring to FIG. 4, a dataflow diagram is shown illustrating the actions performed by the hardware interface layer 202 and the hardware layer 102 to execute the method 300 according to one embodiment of the present invention.

The method 300 may, for example, be performed by a management process 404 executing in the hardware interface layer 202. The management process 404 may, for example, be a part of the SAL which is authorized by the hardware layer 102 to access the protected resources 204*a-b*. Although only the single hardware interface layer 202 is shown in FIGS. 2B and 4, the hardware interface layer 202 may be further subdivided into additional layers, such as a PAL and a SAL, in which case the management process 404 may reside in the SAL and make requests to the PAL for access to the protected resources 204.

The method 300 is triggered by a reset interrupt 406 which may, for example, be generated by the operating system 112 upon system startup (step 302). The reset method 300 may be implemented as an interrupt service routine having a known entry point in the hardware interface layer 202. The reset interrupt 406 may, for example, be generated to perform a cold boot, warm boot, or other kind of reset of the computer system 220. The method 300 may also be performed, for example, after unloading the operating system currently executing on the computer system 220.

The hardware layer 202 includes default protected mode indicator 418 which stores a default value for the protected mode indicator 206. The defaulted protected mode indicator 418 may be stored in a persistent or semi-persistent storage medium such as CMOS or flash RAM. The value of the default protected mode indicator 418 may initially be set at the time of manufacture. The management process 404 may also allow the user 408 to modify the value of the default protected mode indicator 418 during and/or after the reset process. Upon powering up the computer system 220, for example, the management process 404 may present the user 408 with a configuration user interface (UI) 416 which displays the current value of configuration information such as the default protected mode indicator 418. The user 408 may provide configuration modification commands 420 to the management process 404 through the configuration UI 416, thereby instructing the management process 404 to modify the value of the default protected mode indicator 418. The default protected mode indicator 418 may retain this value until next modified by the user 408.

Returning to FIG. 3, the method 300 identifies the default value of the protected mode indicator 206 (step 304). The management process 404 may identify this value by reading it from the default protected mode indicator 418. Alternatively, the value of the default protected mode indicator 418 may be hard-coded into the management process 404. For example, the management process 404 may be hard-coded with a default protected mode indicator value of zero, in which case the management process 404 may identify a value of zero in step 304 without the need for the separate default protected mode indicator 418.

The management process 404 writes the identified default protected mode value to the protected mode indicator 206 (step 306). The operating system 112 is loaded from a persistent storage medium, such as a hard disk drive, into the operating system layer 104 (step 308). Step 308 may, for example, be performed by a loader (not shown) in the operating system layer 104. The method 300 boots the computer system 220 with the loaded operating system 112 (step 310). Techniques for performing steps 308 and 310 are well-known to those of ordinary skill in the art. Upon completion of the boot process, the operating system 112 (and any other programs having the most-privileged privilege level) are granted or denied access to the protected resources 204 (FIG. 2B) in accordance with the value of the protected mode indicator 206, as will now be described in more detail.

Figure 5:
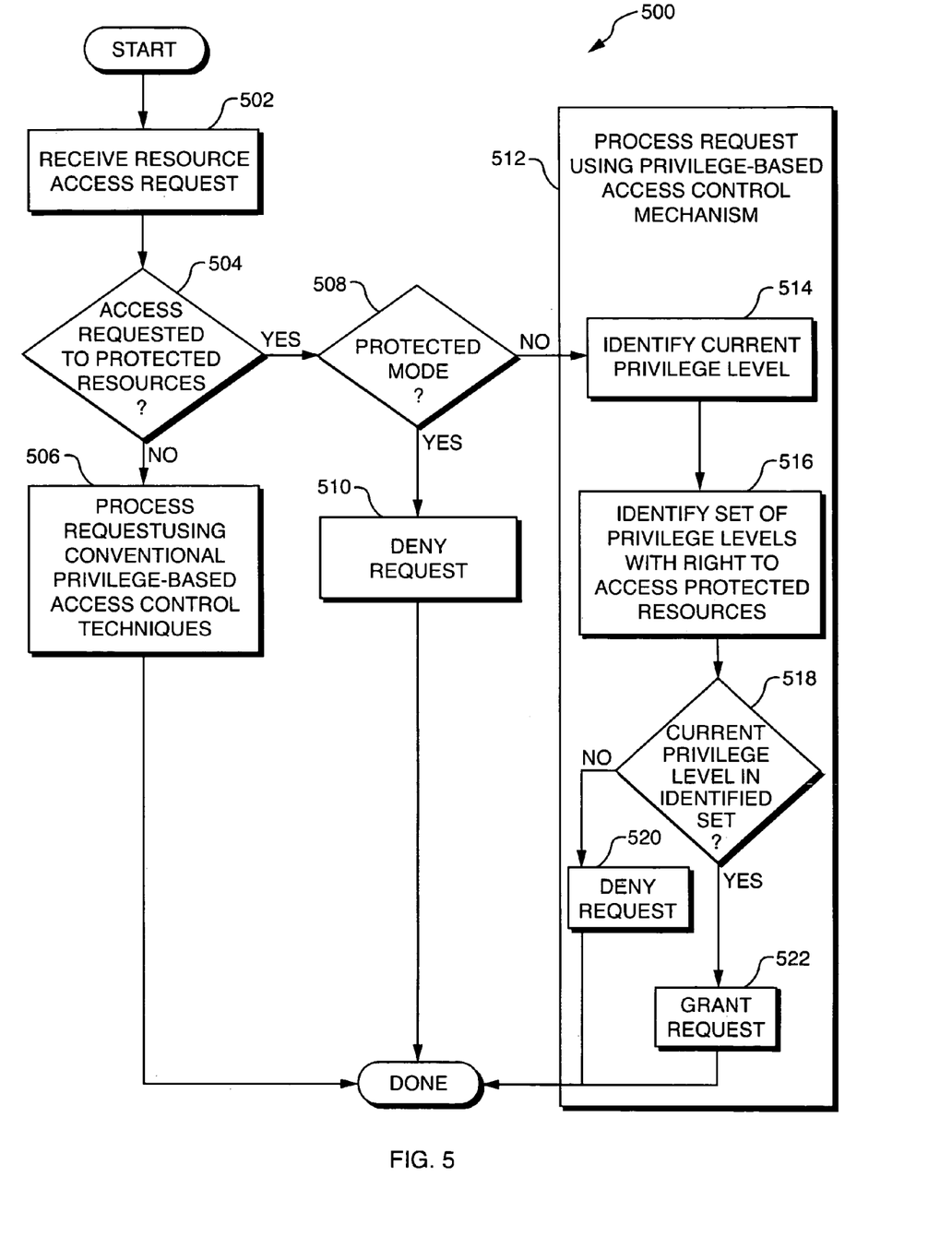
FIG. 5 is a flowchart of a method for processing resource access requests according to one embodiment of the present invention.
Figure 6:
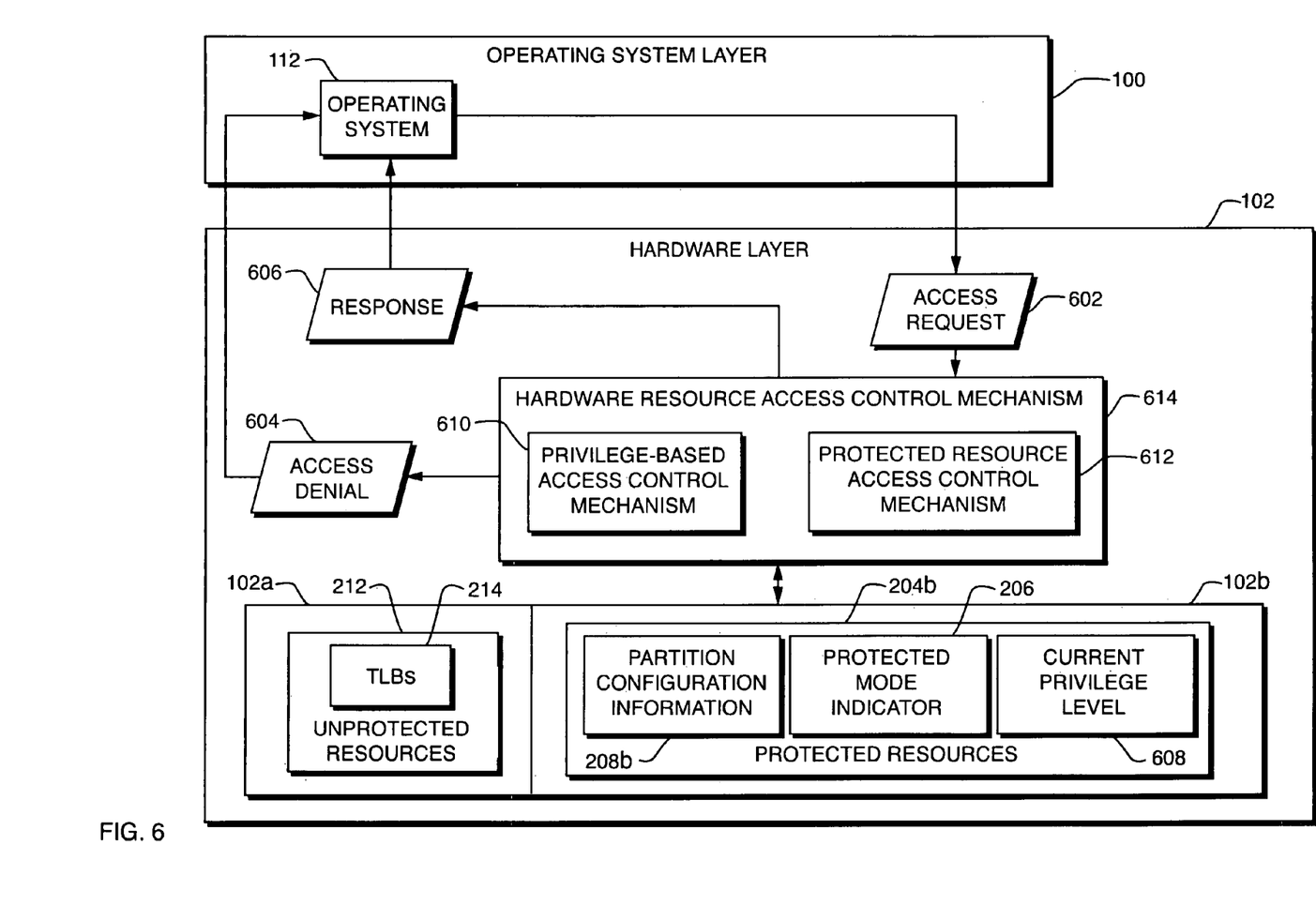
FIG. 6 is a block diagram illustrating the actions performed by the hardware interface layer of FIG. 2B to perform the method of FIG. 5 according to one embodiment of the present invention.

Referring to FIG. 5, a flowchart is shown of a method 500 that may be performed to process resource access requests according to one embodiment of the present invention. Referring to FIG. 6, a block diagram is shown which illustrates the performance of the method 500 by components in the hardware layer 102.

The method 500 receives a request 602 to access a resource in the hardware layer 102, such as one of the unprotected resources 212 or one of the unprotected resources 204*b* (step 502). In the embodiment illustrated in FIG. 6, the hardware layer 102 includes a hardware resource access control mechanism 614 which controls access to the unprotected resources 212 and to the protected resources 204*b*. The hardware resource access control mechanism 614 includes a protected resource access control mechanism 612, which controls access to the protected resources 204*b*, and a privilege-based access control mechanism 610, which controls access to the unprotected resources 212.

The hardware resource access control mechanism 614 may, for example, receive the request 602 from the operating system 112 or from one of the applications 134*a-b* executing in the application layer 106. The method 500 determines whether the access request 602 requests access to any of the protected resources 204*b* (step 504). Examples of techniques that may be used to perform step 504 will be described in more detail below.

If the request 602 does not request access to any of the protected resources 204, the method 500 processes the request 602 using conventional privilege-based access control techniques (step 506). Step 506 may, for example, be performed by the privilege-based access control mechanism 610. Note that the privilege-based access control mechanism 610 may have internal access to the protected resources 204*b* and make use of such resources, such as the current privilege level 608, to determine whether to grant the requesting program access to the requested resource.

Requests to access unprotected resources 212 may thereby be processed in the same manner as in a conventional system which uses privilege-based resource access controls. Although the method 500 illustrated in FIG. 5 uses access controls based on privilege levels, this is not a requirement of the present invention. Rather, requests to access unprotected resources 212 may be handled in any manner.

If the access request 602 requests access to any of the protected resources 204*b*, the method 500 determines whether the computer system 220 is operating in protected mode (step 508). The protected resource access control mechanism 612 may, for example, perform step 508 by reading the value of the protected mode indicator 206. If the computer system 220 is operating in protected mode, the method 500 denies the access request 602 (step 510). The protected resource access control mechanism 612 may, for example, perform step 510 by transmitting an access denial 604 to the operating system 112 or by signaling a fault.

Therefore, all programs—including programs having the most-privileged privilege level—are denied access to the protected resources 204b when the computer system 220 is operating in protected mode.

If the computer system 220 is not operating in protected mode, the method 500 processes the request 602 using the privilege-based access control mechanism 610 (step 512). As will now be described in more detail, the privilege-based access control mechanism 610 may grant or deny the request 602 based on the privilege level of the requesting program.

The access control mechanism 610 identifies the value of the current privilege level 608 (step 514), and identifies the set of privilege levels which have the right to access the protected resources 204 (step 516). A particular subset of privilege levels may, for example, be predefined as having the right to access the protected resources 204b. In one embodiment of the present invention, only programs having the most-privileged privilege level (e.g., privilege level zero) have the right to access the protected resources 204b. Any privilege level or combination of privilege levels may, however, be defined as having access to the protected resources 204b.

The access control mechanism 610 determines whether the current privilege level 608 is in the identified set of privilege levels having the right to access the protected resources 204b (step 518). If the current privilege level 608 is not in the identified set of privilege levels having the right to access the protected resources 204b, the access control mechanism 610 denies the access request 602 (step 520). The access control mechanism 610 may, for example, transmit a response 606 to the operating system 112 indicating that the request 602 has been denied. If the current privilege level 608 is in the identified set of privilege levels having the right to access the protected resources 204b, the access control mechanism 610 grants the request 602 (step 522), such as by performing the requested operation on the specified resource and returning any appropriate results to the operating system 112 (or other requesting program) in the response 606. The response 606 may, for example, include data read from the protected resources 204.

One effect of the method 500 is to deny all software programs access to the protected resources 204b when the computer system 220 is operating in protected mode, and to grant access only to software programs having appropriate privilege levels (such as the most-privileged level) when the computer system 220 is operating in non-protected mode. In other words, access to the protected resources 204b is denied even to programs having the most-privileged access level when the computer system 220 is operating in protected mode.

Although the access control mechanism 610 is described above as using conventional techniques to handle the access request 602 only when the computer system 220 is operating in non-protected mode, this is not a requirement of the present invention. Rather, the privilege-based access control mechanism 610 may process requests to access protected and non-protected resources in the same way. For example, the access control mechanism 610 may define rights to access the protected resources 204 in the same manner as it defines rights to access non-protected resources. The access control mechanism 610 may, for example, define a "read protected resource" right and a "write protected resource" right. The access control mechanism 610 may associate such rights with each existing privilege level. For example, the most-privileged privilege level may be granted the right to read and write from the protected resources 204b, while all other privilege levels may be denied the right to read and write from the protected resources 204. Once such rights have been defined, the access control mechanism 610 may handle requests to access the protected resources 204 using the same (conventional) procedures that it uses to handle requests to access non-protected resources. In such a scheme, step 512 may be implemented in the same manner as step 506.

Note that for ease of explanation the embodiment illustrated in FIG. 6 employs a single protected mode indicator 206 which indicates whether the computer system 220 is operating in protected mode. In such a system, all requests to access the protected resources 204b are denied when the system 220 is operating in protected mode; even if such requests are made by the hardware interface layer 202.

Alternatively, when a resource access request is made by a software program (such as the operating system 112), the current state of the protected mode indicator 206 may be saved in a temporary register. The value of the protected mode indicator 206 may then be set to the "disabled" value, so that the component handling the request (e.g., the hardware interface layer 202 or hardware layer 102) may access the protected resources 204 without restriction. Once the resource access request has been handled, the previous value of the protected mode indicator 206 may be restored from the temporary register before returning control to the operating system 112 or other requesting process.

Although the embodiment illustrated in FIG. 6 involves a request made by the operating system 112 directly to the hardware layer 102 to access protected resources 204b in the hardware layer 102, similar techniques may be applied to handle a request by the operating system 112 to access the protected resources 204b indirectly through the hardware interface layer 202, or to access the protected resources 204a in the hardware interface layer 202 itself. In any of these cases, the techniques described above with respect to FIG. 5 may be applied to grant or deny the operating system's request to access the protected resources 204.

Recall that the method 500 shown in FIG. 5 determines (in step 504) whether the resource access request 602 (FIG. 6) requests access to any of the protected resources 204. This determination may be made in any of a variety of ways. The protected resources 204 may, for example, include one or more machine-specific registers (MSRs) in the hardware layer 102. An MSR is a kind of register that is commonly used in computer systems having multiple processors and/or processors having multiple processor cores. In such systems, an MSR may be shared (available for use) by all processors, by all processor cores on a single chip, or by a particular processor or processor core. MSRs, therefore, unlike conventional processor registers, may control information that is either shared or not shared among processors and/or processor cores. A set of MSRs may be predefined as protected resources, in which case the techniques disclosed herein may be used to control access to such MSRs. The set of protected MSRs may be defined by the hardware layer 102 and/or the hardware interface layer 202. If the access request 602 requests access to an MSR, the management process 404 may perform step 504 by determining whether the above-mentioned table indicates that the requested MSR is one of the protected resources 204.

In another embodiment of the present invention, the protected resources 204 are implemented by mapping the protected resources 204 to a range of addresses which are outside of the range of addresses allocated to the operating system 112 (and outside of the range of addresses allocated to any other operating system in the computer system 220 from which the protected resources 204 are to be protected). More specifically, techniques are well-known for allocating a particular address space to the operating system 112 upon bootup of the computer system 220. The computer system 220 may, for example, be a multi-partition computer system, in which case the operating system 112 may be one of a plurality of operating systems, each of which executes in a distinct partition in the computer system 220. Associated with each partition may be an address space (referred to as a "physical address space") through which the operating system 112 and other components in the partition may access the resources (such as memory locations and MSRs) that are allocated to the partition.

For example, the computer system 220 may include one or more memory controllers which allow the memory locations in the multiple memory components 110a-c to be addressed using a single contiguous address space (referred to herein as a "system address space"), as if the memory components 110a-c were a single memory component. Assume for purposes of example in the following discussion that the system address space of the computer system 220 is fully addressable using 50-bit addresses.

Further assume that the computer system 220 includes two partitions, each with its own operating system. If the 50-bit system address space were divided evenly between the two partitions, each partition would be allocated a 49-bit address space. Each such address space may be viewed as a 50-bit address space in which the high bit is clear. In such an example, the protected resources 204 may be mapped to 50-bit addresses in which the high bit (e.g., bit 50) is set. Techniques are well-known, for example, for enabling I/O devices to be addressed using memory addresses using "memory-mapped I/O." Any other kind of computer resource may similarly be addressable through memory addresses in the physical address space allocated to a particular operating system.

To prevent the protected resources 204 from being accessed by the operating system 112 (or by any other operating system or process in the computer system 220), the management process 404 may inform (after step 308 in FIG. 3) each partition (and associated operating system) that it is allocated a 49-bit physical address space. After bootup, each operating system may access memory using addresses in its 49-bit physical address space. Techniques are well-known for using the hardware interface layer 202 to translate such 49-bit addresses into 50-bit system addresses which may be used to access the appropriate memory locations in the memory components 110a-c.

Figure 7:
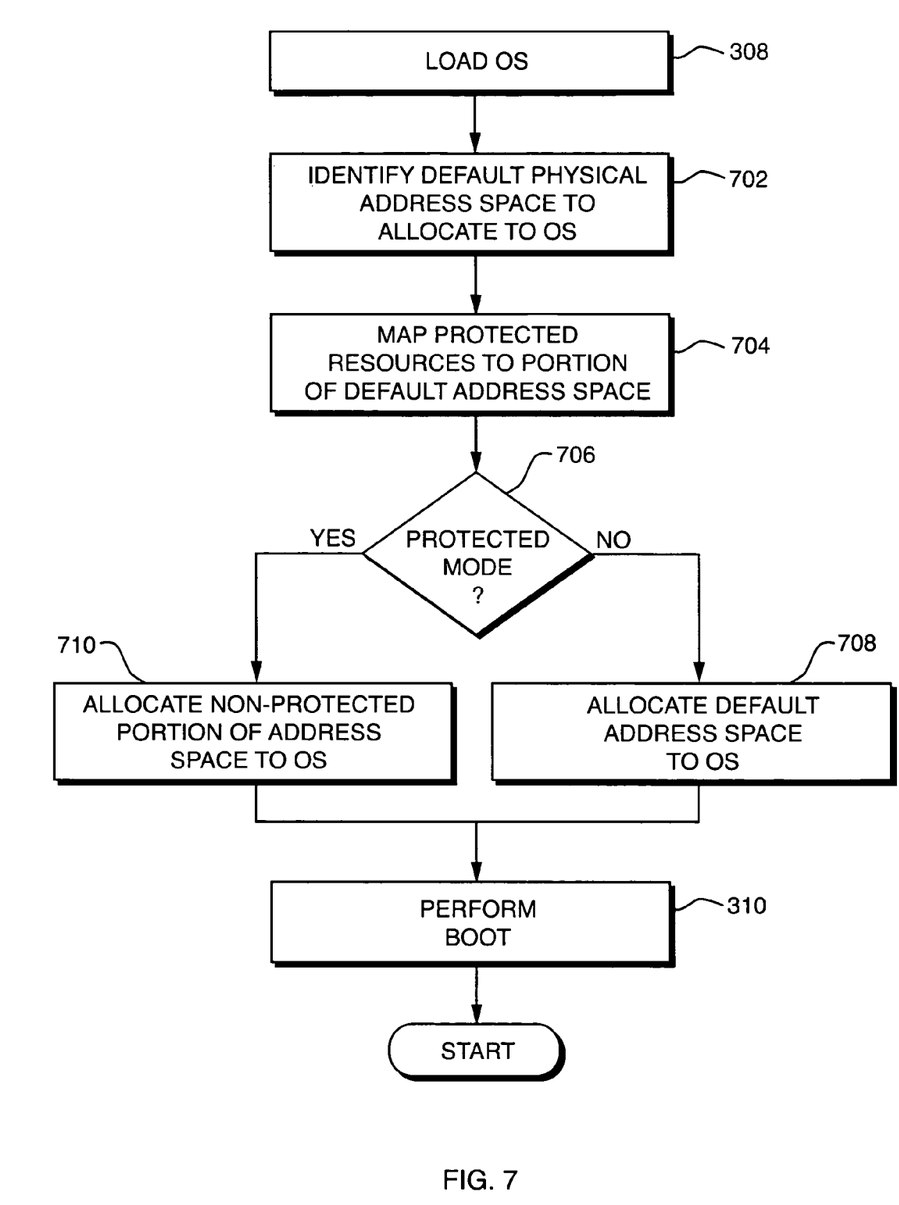
FIG. 7 is a flowchart of a method that is performed by the hardware interface layer of FIG. 2B upon bootup to map protected resources to a portion of an address space according to one embodiment of the present invention.

Referring to FIG. 7, a flowchart is shown of a method that is performed by the management process 404 upon bootup in one embodiment of the present invention to map the protected resources 204 to a portion of the physical address space allocated to a particular operating system. The method shown in FIG. 7 may be performed between steps 308 (loading the operating system 112) and step 310 (booting the system 220) of the method 300 (FIG. 3). Note that the method shown in FIG. 7 may be performed for each partition (and hence for each operating system) in a multi-partition computer system.

After loading the operating system 112 (step 308), the management process 404 identifies the default physical address space to allocate to the operating system 112 (step 702). As noted above, in a two-partition computer system, each operating system may, by default, be allocated a physical address space which contains one fewer bit than the full system address space. For example, in a two-partition computer system having a 50-bit system address, each operating system may by default be allocated a 49-bit physical address space. More generally, the management process 404 may identify the default physical address space to be allocated to the operating system 112 using any pre-existing mechanism in the computer system 220 for allocating physical address spaces to partitions. For example, configuration registers in the partition configuration information 208 may define the default physical address spaces to be allocated to partitions in the computer system 220.

The management process 404 maps the protected resources 204 to a portion of the identified default physical address space (step 704). For example, in the case of a 49-bit physical address space with bits numbered from 0 (LSB) through 48 (MSB), the management process 404 may map the protected resources 204 to addresses in which the most significant bit (e.g., bit 48) is set. Alternatively, the management process 404 may append an additional bit (e.g., bit 49) to the default address space and map the protected resources 204 to addresses having the additional bit set.

The management process 404 determines whether the computer system 220 is to boot in protected mode (step 706). The management process 404 may, for example, perform step 706 by reference to the protected mode indicator value identified in step 304 (FIG. 3).

If the computer system 220 is not to be booted in protected mode, the management process 404 allocates the default physical address space to the operating system 112 (step 708). If the computer system 220 is to be booted in protected mode, the management process 404 allocates the non-protected portion of the default physical address space to the operating system 112 (step 710). The "non-protected portion" refers to that portion of the default physical address space which does not include addresses to which the protected resources 204 are mapped. In the embodiment described above, for example, in which the default physical address space is a 49-bit address space, the protected resources 204 may be mapped to addresses in which the most-significant bit (e.g., bit 49) is set (equal to 1), i.e. the upper half of a 50-bit address space. In that case, the "non-protected portion" of the default address space would be a 49-bit address space in which the most-significant bit is cleared (equal to 0), i.e. the lower half of a 50 bit address space. The management process 404 may allocate such an address space to the operating system 112 by informing the operating system 112 that its physical address space is 48 bits wide, thereby excluding (protected) addresses in which the $49^{th}$ bit is set.

After allocating a physical address space to the operating system 112, the management process 404 boots the computer system (step 310), as described above with respect to FIG. 3. When the operating system 112 subsequently issues a resource access request which requests access to the protected resources 204, the conventional memory access control mechanisms in the computer system 200 may be utilized to allow the operating system 112 to access the protected resources 204 only when the computer system 200 is not operating in protected mode.

For example, recall that the method 500 illustrated in FIG. 5 determines in step 504 whether the resource access request 602 (FIG. 6) requests access to the protected resources 204. Step 504 may be performed, for example, by using the mechanisms which already exist in a partitionable computer system for determining whether the address in the request 602 is within the physical address space that has been allocated to the operating system 112. If the operating system 112 attempts to access the protected resources 204 while the computer system 200 is operating in protected mode, these conventional mechanisms will detect such an attempt by recognizing that the requested address falls outside of the physical address space allocated to the operating system 112 (e.g., because its high bit is set). If the operating system 112 or other program attempts to access the protected resources 204 while the computer system 200 is operating in non-protected mode, the techniques described above with respect to FIG. 5 may be used to ensure that only programs having an appropriate privilege level can access the protected resources 204.

One advantage of techniques disclosed herein is that they enable specified resources, such as the partition configuration information 208 in the hardware interface layer 202, to be protected from access even by programs having the most-privileged access level. As described above, in a conventional computer system which implements access privileges, programs (such as the operating system) having the most-privileged access level are allowed to access all resources in the computer system. Although such unrestricted access may be acceptable or even desirable in certain computer systems, it is desirable in some computer systems (such as partitionable computer systems) to protect certain resources (such as the partition configuration information 208) from being accessed even by programs having the most-privileged access level. To make such resources accessible to an operating system would, for example, enable that operating system to modify the partition configuration information 208 and thereby to interfere with the operation of other partitions. Such a result would violate the inter-partition security that should be guaranteed by a partitionable computer.

Another advantage of techniques disclosed herein is that they enable an additional level of resource protection to be added to a computer system without requiring the operating system(s) or application programs in the computer system to be modified. The techniques disclosed herein may, in other words, be implemented in a manner that is transparent to the operating system 112 and to application programs executing in the application layer 106. Such techniques thereby avoid the added expense and time that would be required to modify the operating system and applications to work in conjunction with a protection scheme that protects the protected resources 204 in the manner described above. Furthermore, because such techniques are implemented independently of the operating system(s) and application programs, such techniques may protect the desired resources regardless of the manner in which the operating system(s) and application programs are implemented.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Although particular examples of the protected resources 204 are provided above, the techniques disclosed herein may be used to protect any kind of resources. For example, the techniques disclosed herein may be used to protect partition-related system configuration information, regions of memory, I/O controllers, processor configuration information, testing/diagnostic resources, and registers. Although the protected resources 204 in the examples above are located in both the hardware layer 102 and the hardware interface layer 202, this is not a requirement of the present invention. Rather, the techniques disclosed herein may be used to protect resources located in any component or layer of a computer system. Similarly, although access control is performed by the management process 404 in the hardware interface layer 202 in the examples above, this is not a requirement of the present invention. Rather, access control may be performed by any component or combination of components in a computer system. Furthermore, although the IA-64 PAL and SAL are described herein as examples of the hardware interface layer 202, the techniques disclosed herein may be implemented in conjunction with any computer architecture.

The management process 404 is described herein as performing a variety of functions. The management process 404 may alternatively be implemented, for example, as a management processor. A management processor is a processor commonly used in servers to perform system management functions such as booting up the server with an appropriate operating system.

Although certain examples described herein refer to access control schemes which recognize two privilege levels (a most-privileged level and a less-privileged level), the techniques disclosed herein may be used in conjunction with access control schemes which recognize any number of privilege levels. Furthermore, although in the examples provided above the protected resources 204 may be accessed only by programs having the most-privileged level when the computer system 220 is operating in protected mode, this is not a requirement of the present invention. Rather, when the computer system 220 is operating in protected mode, access may be provided to programs having any predetermined privilege level. For example, a set of privilege levels (such as privilege levels zero and one) may be specified as the set of privilege levels for which access to the protected resources 204 will be granted.

Although in the examples described above, the computer system 220 may be configured to operate in either protected mode or non-protected mode, this is not a requirement of the present invention. Rather, a particular computer system may be configured always to operate in protected mode, in which case programs executing in the operating system layer 104 and application layer 102 would never be provided access to the protected resources 204.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A computer-implemented method for use in a computer system including a plurality of resources, the method comprising steps of:
   (A) receiving a request from a software program to access a specified one of the plurality of resources;
   (B) determining whether the specified one of the plurality of resources is a protected resource;
   (C) if the specified one of the plurality of resources is a protected resource, performing steps of:
      (1) if the computer system is operating in a protected mode of operation, then denying the request regardless of access rights associated with the software program including software programs having a most-privileged level; and
      (2) processing the request based on the access rights associated with the software program if the computer system is not operating in the protected mode of operation.

2. The method of claim 1, wherein the software program comprises an operating system.

3. The method of claim 1, wherein the software program comprises an application program.

4. The method of claim 1, wherein the specified one of the plurality of resources comprises a memory location.

5. The method of claim 1, wherein the specified one of the plurality of resources comprises a processor register.

6. The method of claim 1, wherein the specified one of the plurality of resources comprises a register in a hardware interface layer in the computer system.

7. The method of claim 1, wherein the step (C)(2) comprises steps of:
   (C)(2)(a) identifying a privilege level associated with the software program;
   (C)(2)(b) identifying the access rights associated with the privilege level; and
   (C)(2)(c) granting the request only if the access rights include a right to access the specified one of the plurality of resources.

8. The method of claim 7, wherein the computer system implements a plurality of resource access privilege levels including a most-privileged privilege level, and wherein the step (C)(2)(c) includes a step of granting the request only if the privilege level of the software program is the most-privileged privilege level.

9. The method of claim 8, wherein the software program comprises an operating system.

10. The method of claim 1, further comprising a step of:
    (D) if the specified one of the plurality of resources is not a protected resource, processing the request based on access rights associated with the software program.

11. The method of claim 1, wherein the step (B) comprises steps of:
    (B)(1) identifying an address by which the specified one of the plurality of resources is identified in the request; and
    (B)(2) determining that the specified one of the plurality of resources is a protected resource if the address is in a predetermined range of protected addresses.

12. A computer-implemented method for use in a computer system including a plurality of resources, the method comprising steps of:
    (A) receiving a request from an operating system to access a specified one of the plurality of resources;
    (B) determining whether the specified one of the plurality of resources is a protected resource;
    (C) if the specified one of the plurality of resources is a protected resource, performing steps of:
       (1) if the computer system is operating in a protected mode of operation, then denying the request regardless of access rights associated with the software program including software programs having a most-privileged level; and
       (2) processing the request based on access rights associated with the operating system if the computer system is not operating in the protected mode of operation, by performing steps of:
          (a) identifying a privilege level associated with the operating system;
          (b) identifying the access rights associated with the privilege level;
          (c) granting the request only if the privilege level of the operating system is a most-privileged level from among a plurality of privilege levels in the computer system; and
    (D) if the specified one of the plurality of resources is not a protected resource, processing the request based on access rights associated with the operating system.

13. A device for use in a computer system including a plurality of resources, the device comprising:
    means for receiving a request from a software program to access a specified one of the plurality of resources;
    means for determining whether the specified one of the plurality of resources is a protected resource;
    protected resource access control means comprising:
       means for denying the request, regardless of access rights associated with the software program including software programs having a most-privileged level, if the computer system is operating in a protected mode of operation and the specified one of the plurality of resources is a protected resource; and
       means for processing the request based on the access rights associated with the software program if the computer system is not operating in the protected mode of operation and the specified one of the plurality of resources is a protected resource.

14. The device of claim 13, wherein the software program comprises an operating system executing in the computer system.

15. The device of claim 13, wherein the software program comprises an application program executing in the computer system.

16. The device of claim 13, wherein the specified one of the plurality of resources comprises a memory location in a memory in the computer system.

17. The device of claim 13, wherein the specified one of the plurality of resources comprises a register in a process in the computer system.

18. The device of claim 13, wherein the specified one of the plurality of resources comprises a register in a hardware interface layer in the computer system.

19. The device of claim 13, wherein the step means for processing the request comprises first identification means for identifying a privilege level associated with the software program, second identification means for identifying the access rights associated with the privilege level, and means for granting the request only if the access rights include a right to access the specified one of the plurality of resources.

20. The device of claim 19, wherein the computer system further comprises means for implementing a plurality of resource access privilege levels including a most-privileged privilege level, and wherein the second identification means comprises means for granting the request only if the privilege level of the software program is the most-privileged privilege level.

21. The device of claim 20, wherein the software program comprises an operating system executing in the computer system.

22. The device of claim 13, further comprising:
 means for processing the request based on access rights associated with the software program if the specified one of the plurality of resources is not a protected resource.

23. The device of claim 13, wherein the means for determining comprises means for identifying an address by which the specified one of the plurality of resources is identified in the request, and means for determining that the specified one of the plurality of resources is a protected resource if the address is in a predetermined range of protected addresses.

* * * * *